United States Patent
Ono et al.

(10) Patent No.: US 9,435,401 B2
(45) Date of Patent: Sep. 6, 2016

(54) SHIFT ACTUATOR

(71) Applicant: HONDA MOTOR CO., LTD., Tokyo (JP)

(72) Inventors: Yuki Ono, Wako (JP); Yuji Okazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/526,068

(22) Filed: Oct. 28, 2014

(65) Prior Publication Data

US 2015/0128737 A1    May 14, 2015

(30) Foreign Application Priority Data

Nov. 8, 2013   (JP) .................................. 2013-232563

(51) Int. Cl.
*F16H 61/38*   (2006.01)
*F16H 3/38*    (2006.01)
*F16H 63/30*   (2006.01)

(52) U.S. Cl.
CPC ............ *F16H 3/38* (2013.01); *F16H 63/3026* (2013.01); *Y10T 74/19242* (2015.01); *Y10T 74/20024* (2015.01)

(58) Field of Classification Search
CPC ........... F16H 3/006; F16H 2003/0931; F16H 3/091; F16H 47/02
USPC ......................................... 74/330, 331, 335
See application file for complete search history.

(56) References Cited

U.S. PATENT DOCUMENTS

| | | | | |
|---|---|---|---|---|
| 4,638,690 A * | 1/1987 | Hattori | ................ | F16H 61/0213 477/123 |
| 4,784,007 A * | 11/1988 | Ishida | ................... | B60W 30/18 477/124 |
| 8,413,777 B2 * | 4/2013 | Lundberg | ............ | F16H 61/0206 192/3.58 |
| 8,430,220 B2 * | 4/2013 | Lundberg | .............. | F16H 61/688 192/3.58 |

FOREIGN PATENT DOCUMENTS

JP          5280311 B2    9/2013

* cited by examiner

*Primary Examiner* — Ha D Ho
(74) *Attorney, Agent, or Firm* — Westerman, Hattori, Daniels & Adrian, LLP (57) ABSTRACT

A shift actuator includes a first and a second fluid pressure chamber providing fluid pressure to each of a first and a second piston, a hydraulic control device for regulating pressure of hydraulic oil discharged from a hydraulic source and supplying the same, a first and a second oil passage communicated from the hydraulic control device to each of the first and the second fluid pressure chamber, a first and a second connecting portion for connecting the first oil passage with the first fluid pressure chamber and the second oil passage with the second fluid pressure chamber, and a first and a second orifice portion having a diameter smaller than the inner diameter of the first and the second oil passage provided to each of the first and the second connecting portion.

12 Claims, 8 Drawing Sheets

SHIFT ACTUATOR

REFERENCE OF THE RELATED ART

This disclosure relates to the subject involved in Japanese patent application No. 2013-232563 filed on 8 Nov. 2013, and is, as a whole, expressly incorporated to the patent application by the reference.

BACKGROUND OF THE INVENTION

1. Field of the Invention

This invention relates to a shift actuator giving fluid pressure to a piston slidably installed in a cylinder, whereby driving a shift operating member for gear shift by the piston.

2. Description of the Related Art

In the conventional art, there are transmissions having a synchronous mechanism for moving a synchro sleeve by a shift fork. And in these transmissions, as shown in Japanese Pat. No. 5280311 (patent literature 1), some have a shift actuator for driving a shift fork. The shift actuator includes a piston slidably installed in a cylinder, a fluid pressure chamber defined opposite to the piston in the cylinder to be supplied with fluid pressure such as oil pressure, and a shift fork (a shift operating member) driven by the piston, whereby the shift fork is driven to the shift direction (the axial direction of a fork shaft) by the piston which slides in the cylinder due to the fluid pressure supplied to the fluid pressure chamber.

Hereupon, in a shift actuator described in the patent literature 1, the shift actuator for driving a shift fork and a hydraulic control device for controlling oil pressure supplied to the shift actuator are integrally provided. And an orifice portion (small-diameter portion) for controlling flow rate of hydraulic oil fed into the shift actuator is installed on an oil passage in the hydraulic control device.

Whereas, the hydraulic control device and the shift actuator may be disposed on mutually separated positions according to the arrangement configuration of a rotation shaft such as an input shaft and an output shaft, and gears in a transmission. This configuration is provided with a hydraulic pipe (oil passage) which is connected from the hydraulic control device to the shift actuator is provided, oil pressure for controlling is supplied from the hydraulic control device to the shift actuator through the hydraulic pipe.

In this case, however, as well as the conventional configuration, when the orifice portion (small-diameter portion) for controlling flow rate of hydraulic oil fed into the shift actuator is provided on the oil passage in the hydraulic control device, it takes a long time until the hydraulic oil is filled into the hydraulic pipe connecting the shift actuator with the hydraulic control device and the fluid pressure chamber, which may prevent securing the satisfactory responsiveness and controllability of the shift actuator.

SUMMARY OF THE INVENTION

The present invention is made in view of the above points, and the object of the present invention is to provide a shift actuator capable of securing satisfactory responsiveness and controllability even when a hydraulic control device which is a source of hydraulic supply and a fluid pressure chamber of the shift actuator which is a destination of hydraulic supply are disposed on mutually separated positions.

The present invention for solving the above mentioned problem includes a first cylinder (35-1) disposed in a casing (3) of a transmission (1) mounted on a vehicle, a first piston (33-1) and a second piston (33-2) coaxially arranged in the first cylinder (35-1), a first and a second fluid pressure chamber (34-1, 34-2) defined in the first cylinder (35-1) to provide fluid pressure to each of the first piston and the second piston (33-1, 33-2), a first shaft (13-1) disposed so that the axial direction thereof is in parallel to the axial direction of the first cylinder (35-1), a first shift operating member (12-1) supported by the first shaft (13-1) with inserted and disposed between the first piston (33-1) and the second piston (33-2) to move back and forth along the axial direction of the first shaft (13-1), a hydraulic control device (5) for regulating hydraulic oil discharged from a hydraulic source and supplying the same, a first and a second oil passage (9-1, 9-2) communicated from the hydraulic control device (5) to each of the first and the second fluid pressure chamber (34-1, 34-2), a first and a second connecting portion (38-1, 38-2) for respectively connecting the first and the second oil passage (9-1, 9-2) with the first and the second fluid pressure chamber (34-1, 34-2), and a first and a second orifice portion (36-1, 36-2) having a diameter smaller than the inner diameter of the first and the second oil passage (9-1, 9-2) respectively provided on the first and the second connecting portion (38-1, 38-2).

By means of the shift actuator of the present invention, the following effects can be achieved.

Each of the first and the second connecting portion for respectively connecting the first and the second oil passage with the first and the second fluid pressure chamber is provided with the first and the second orifice portion having a diameter smaller than the inner diameter of the first and the second oil passage, whereby the time for filling the first and the second oil passage and the first and the second fluid pressure chamber with hydraulic oil is shortened when supplying hydraulic oil from the hydraulic control device to the first and the second fluid pressure chamber. Accordingly, even when the hydraulic control device which is a source of hydraulic supply and the first and the second fluid pressure chamber of the shift actuator which are destinations of hydraulic supply are disposed on mutually separated positions, the satisfactory responsiveness of the shift actuator is secured.

By providing the first and the second orifice portion, hydraulic oil remains in the first and the second fluid pressure chamber also when a driving source and the transmission of the vehicle is in a soak (an operation stop) condition, whereby the responsiveness in filling the first and the second fluid pressure chamber with hydraulic oil after returning from the soak condition can be secured.

The first and the second connecting portion for connecting the first oil passage with the first fluid pressure chamber and the second oil passage with the second fluid pressure chamber are provided with the first and the second orifice portion, whereby backflow of hydraulic oil from the first and the second fluid pressure chamber toward the oil passages is prevented. This enables to generate reaction force against the operation of the shift actuator by a damper effect of hydraulic oil remaining in the opposing fluid pressure chambers, whereby operation noise accompanying the operation of the shift actuator (such as contact noise due to the mutual contact of machine components) is effectively reduced.

Additionally, in the above-mentioned shift actuator, in the state where the transmission (1) is installed, it is preferable that a height position of the first and the second fluid pressure chamber (34-1, 34-2) is positioned on the upper side than the height position of the vertical direction of the hydraulic control device (5), therewith the first and the second orifice portion (36-1, 36-2) are respectively disposed adjacent to the first and the second fluid pressure chamber (34-1,34-2).

As mentioned above, when the hydraulic control device which is a source of hydraulic supply is positioned on the lower side and the first and the second fluid pressure chamber which are destinations of hydraulic supply are positioned on the upper side, hydraulic oil tends to flow backward from the first and the second fluid pressure chamber toward the first and the second oil passages, whereas in the shift actuator according to the present invention, each of the first and the second connecting portion disposed adjacent to the first and the second fluid pressure chamber is provided with the first and the second orifice portion having a diameter smaller than the inner diameter of the first and the second oil passage, whereby backflow of hydraulic oil from the first and the second fluid pressure chamber toward the first and the second oil passage is effectively prevented. This enables to further enhance a damper effect of hydraulic oil remaining in the opposing fluid pressure chamber, whereby operation noise associated with the operation of the shift actuator is effectively reduced.

In addition, the above-mentioned shift actuator includes a first and a second through hole (37-1, 37-2) penetrating from each of the first and the second fluid pressure chamber (34-1, 34-2) to the outside. It is preferable that the diameters of the first and the second through hole (37-1, 37-2) are respectively set to the dimensions smaller than the diameters of the first and the second orifice portion (36-1, 36-2).

By means of this configuration, by providing the first and the second orifice portion, air mixed in hydraulic oil in the first and the second fluid pressure chamber is difficult to be discharged to the outside of the first and the second fluid pressure chamber, whereas the above-mentioned first and the second through hole are provided to effectively discharge the air to the outside of the first and the second fluid pressure chamber also when the air is mixed in hydraulic oil in the first and the second fluid pressure chamber at the initial starting time or the restarting time after a long-term soak.

Additionally, in the above-mentioned shift actuator, the first and the second thorough hole (37-1, 37-2) are preferably disposed at a position higher than a central axis (O1) of the first cylinder (35-1) in a state where the first cylinder (35-1) is installed in the casing (3) of the transmission (1).

By means of this configuration, the first and the second through hole are disposed at a position higher than the central axis of the first cylinder to effectively discharge air mixed in hydraulic oil in the first and the second fluid pressure chamber through the first and the second through hole. This enables to prevent the air from remaining in the first and the second fluid pressure chamber also when, for example, leaving the vehicle for a long period. Therefore, the start responsiveness of the restarting time after a long-term leaving of the vehicle can be improved.

In addition, the above-mentioned shift actuator includes a second cylinder (35-2) disposed adjacent to the first cylinder (35-1), a third piston (33-3) and a fourth piston (33-4) coaxially arranged in the second cylinder (35-2), a third and a fourth fluid pressure chamber (34-3, 34-4) defined in the second cylinder (35-2) to provide fluid pressure to each of the third and the fourth piston (33-3, 33-4), a second shaft (13-2) disposed so that the axial direction thereof is in parallel to the axial direction of the second cylinder (35-2), a second shift operating member (12-2) supported by the second shaft (13-2) with inserted and disposed between the third piston (33-3) and the fourth piston (33-4) to move back and forth along the axial direction of the second shaft (13-2), a third and a fourth oil passage (9-3, 9-4) communicated from the hydraulic control device (5) to each of the third and the fourth fluid pressure chamber (34-3.34-4), a third and a fourth connecting portion (38-3, 38-4) for respectively connecting the third and the fourth oil passage (9-3, 9-4) with the third and the fourth fluid pressure chamber (34-3, 34-4), and a third and a fourth orifice portion (36-3, 36-4) having a diameter smaller than the inner diameter of the third and the fourth oil passage (9-3, 9-4) respectively provided on the third and the fourth connecting portion (38-3, 38-4). The diameters of the first and the second orifice portion (36-1, 36-2) and the diameters of the third and the fourth orifice portion (36-3, 36-4) are preferably set to be the mutually different dimensions.

In this case, additionally, it is preferable that the shift actuator includes a first mechanism (10-1) operated by the first shift operating member (12-1) and a second mechanism (10-2) operated by the second shift operating member (12-2), to achieve higher gear shift stage at the second mechanism (10-2) than gear shift stage achieved at the first mechanism (10-1) and to set the diameter of the first and the second orifice portion (36-1, 36-2) to the smaller dimensions than the diameters of the third and the fourth orifice portion (36-3. 36-4).

In the case where a gear shift stage achieved by a second synchronous engaging device is higher than a gear shift stage achieved by a first synchronous engaging device, driving force required at the time of operation of the first shift operating member is larger than driving force required at the time of operation of the second shift operating member. Meanwhile, according to the above-mentioned configuration, setting the diameters of the first and the second orifice portion to the smaller dimensions than the diameters of the third and the fourth orifice portion enables to set reaction force generated in the opposing piston when operating the first shift operating member larger than reaction force generated in the opposing piston when operating the second shift operating member. Therefore, the operation of the shift actuator enables to set the required time for switching to each gear shift stage to the optimum time at every gear shift stage. Furthermore, operation noise accompanying the operation of the shift actuator can be effectively reduced.

Additionally, in the above-mentioned shift actuator, the transmission (1) includes a first input shaft (6a) connected so as to be engaged with and disengaged from a driving shaft (50a) connected to a driving source (50) of the vehicle through a first clutch (CL1), a second input shaft (6b) connected so as to be engaged with and disengaged from the driving shaft (50a) through a second clutch (CL2), a plurality of drive gears (7a) disposed on the first input shaft (6a) to change speed of rotation caused by driving force input to the first input shaft (6a), a plurality of other drive gears (7b) disposed on the second input shaft (6b) to change speed of rotation caused by driving force input to the second input shaft (6b), an output shaft (6c) for outputting driving force speed-changed through the driving gears (7a, 7b) and a plurality of fixed driven gears (7c) which are engaged with the plurality of drive gears (7a, 7b), a first synchronous engaging device (21) operated by the first and the second shift operating member (12-1, 12-2) to selectively synchronize and engage one of the drive gears (7a) on the first input shaft (6a) with the first input shaft (6a), and a second synchronous engaging device (22) operated by the shift operating members other than the first and the second shift operating member (12-1, 12-2) to selectively synchronize and engage one of the drive gears (7b) on the second input shaft (6b) with the second input shaft (6b). The drive gears (7a) on the first input shaft (6a) may be the drive gears for setting even-numbered gear shift stages, and the drive gears (7b) on the second input shaft (6b) may be the drive gears for setting an odd-numbered gear shift stages.

Furthermore, the above-mentioned references in parentheses shows the references of components in embodiments described below as an example of the present invention.

By means of the present invention, even with a configuration that the hydraulic control device which is a source of hydraulic supply and the fluid pressure chamber of the shift actuator which is a destination of hydraulic supply are disposed on mutually separated positions, the satisfactory responsiveness and controllability of the shift actuator can be secured.

DETAILED DESCRIPTION OF THE INVENTION

Figure 1:
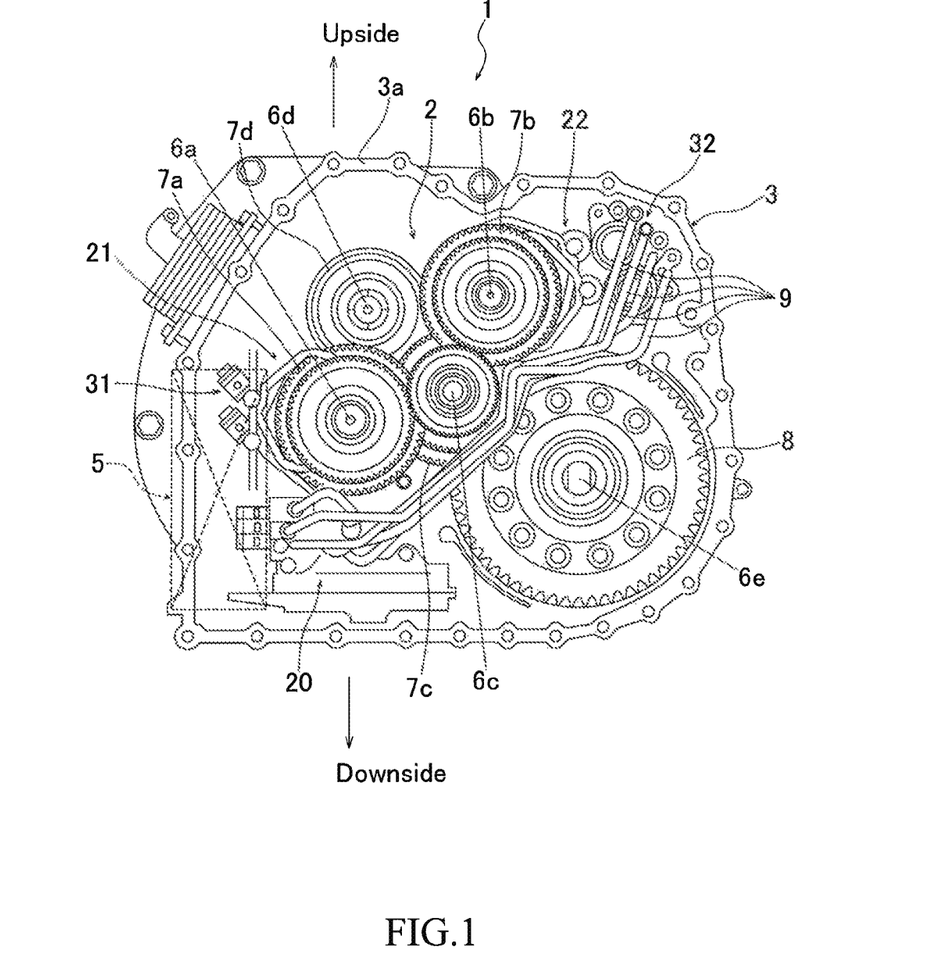
FIG. 1 is a schematic sectional side view showing an example of the whole configuration of a transmission having a shift actuator in accordance with an embodiment of the present invention.

Embodiments of the present invention are described below in detail referring to the attached drawings. FIG. 1 is a schematic sectional side view showing the example of the whole configuration of a transmission (automatic transmission) including a shift actuator in accordance with an embodiment of the present invention. The transmission 1 shown in the figure includes a gear mechanism 2 installed in a casing 3 and a hydraulic control body (hydraulic control device) 5 mounted on the side of the gear mechanism 2. The gear mechanism 2 includes a first input shaft 6a, a second input shaft 6b, an output shaft 6c, an idle shaft 6d, and a differential shaft 6e disposed mutually parallel to one another, and various kinds of gears for forming a gear shift stage are rotatably installed around each of these rotating shafts 6. Furthermore, FIG. 1 shows the transmission 1 in a state where a transmission case (not shown) surrounding the gear mechanism 2 is removed, with viewed from a front-side of the axial direction of the rotation shafts 6. In FIG. 1, further, a detailed showing of components except for the gear mechanism 2 provided to the transmission 1 and synchronous engaging devices (synchromesh mechanisms) 21 and 22 described below are omitted.

On the first input shaft 6a, a plurality of drive gears 7a for changing speed of rotation caused by driving force input to the first input shaft 6a are installed, and on the second input shaft 6b, a plurality of drive gears 7b for changing speed of rotation caused by driving force input to the second input shaft 6b are installed. In addition, the drive gears 7a on the first input shaft 6a are the drive gears for the odd-numbered gear shift stages, and the drive gears 7b on the second input shaft 6b are the drive gears for the even-numbered gear shift stages.

On the output shaft 6c, in addition, a plurality of driven gears 7c engaged with the plurality of drive gears 7a and 7b on the first and the second input shaft 6a and 6b are fixed. The output shaft 6c outputs driving force speed-changed through the drive gears 7a, 7b and the driven gears 7c. Furthermore, the transmission 1 includes a first synchronous engaging device 21 for selectively synchronizing and engaging one of the drive gears 7a on the first input shaft 6a with the first input shaft 6a and a second synchronous engaging device 22 for selectively synchronizing and engaging one of the drive gears 7b on the second input shaft 6b with the second input shaft 6b. Additionally, the transmission 1 is provided with a first shift actuator 31 for driving the first synchronous engaging device 21 and a second shift actuator 32 for driving the second synchronous engaging device 22.

Whereas, the hydraulic control body 5 is a device provided with such as a valve for changing speed which is operated by oil pressure, and is installed on the side part of the lower side of the transmission 1 (the left hand side of FIG. 1). The hydraulic control body 5 is communicated to an adjacent hydraulic oil port portion 20 through the unshown oil passage. Furthermore, each port in the hydraulic port portion 20 is communicated to the second shift actuator 32 through a plurality of hydraulic pipes (oil passages) 9 in which hydraulic oil flows. This causes hydraulic oil (control oil pressure) supplied from an oil pump (unshown) and discharged from the hydraulic control body 5 to be fed to the second shift actuator 32 through the hydraulic pipes 9. In addition, in an installation state of the transmission 1, a height position of the second shift actuator 32 is positioned on the upper side than a height position in the vertical direction of the hydraulic control body 5.

Figure 2:
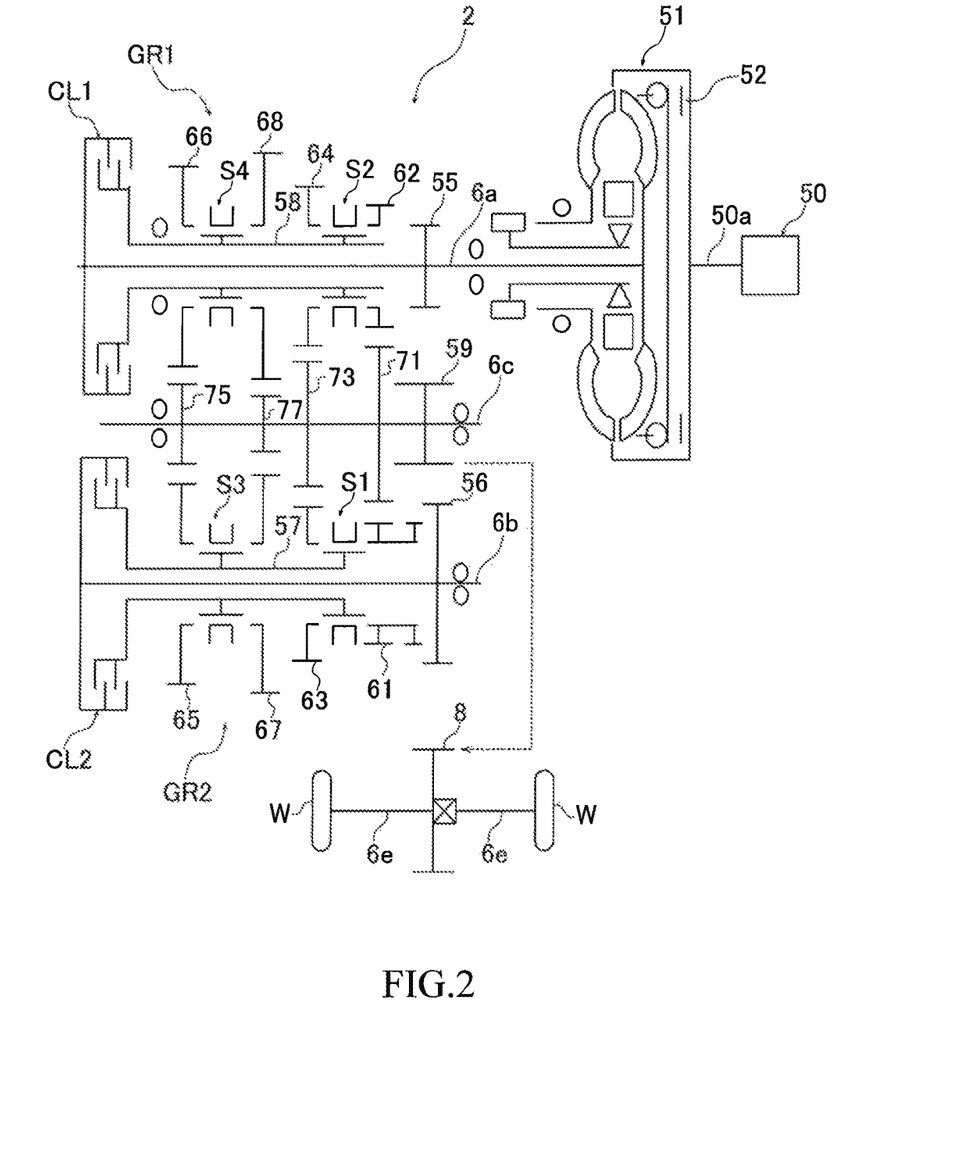
FIG. 2 is a skeleton view of the transmission.

FIG. 2 is the skeleton view of the transmission. As shown in the figure, rotation output of an engine 50 that is a driving source of the vehicle is output to a crankshaft (an output shaft of an engine 50) 50a. Rotation of the crankshaft 50a is transmitted to a torque converter 51 having a lockup clutch 52, wherefrom communicated to the first and the second input shaft 6a and 6b through a first clutch CL1 and a second clutch CL2. The first input shaft 6a and the second input shaft 6b are, that is, connected so as to be engaged with and disengaged from the output shaft 50a of the engine 50 through the first clutch CL1 and the second clutch CL2, respectively. In addition, the rotation torque of the first and the second input shaft 6a and 6b is transmitted to the output shaft 6c through the gear mechanism 2. Furthermore, the rotation torque of the output shaft 6c is transmitted to driving wheels W, W of the vehicle through a gear 59 and a differential gear 8.

The gear mechanism 2 shown in FIG. 2 is a twin clutch type automatic transmission mechanism capable of setting forward eighth speed stages and reverse first speed stage. In the gear mechanism 2, a drive gear 55 fixed on the first input shaft 6a is engaged with a driven gear 56 fixed on the second input shaft 6b. Furthermore, though the mechanisms such as the idle shaft 6d (Cf. FIG. 1), a reverse shaft and a reverse gear for setting a reverse stage are provided in the gear mechanism 2, showing these mechanisms are omitted in FIG. 2.

The first clutch (a clutch for even-numbered stages) CL1 is disposed on an axial end of the first input shaft 6a. The first clutch CL1 switches the engagement and disengagement between the first input shaft 6a and a first driving shaft 58 relatively rotatably fitted to the outer circumference of the first input shaft 6a. A second speed drive gear 62, a fourth speed drive gear 64, a sixth speed drive gear 66, and an eighth speed drive gear 68 are relatively rotatably supported on the first driving shaft 58. In addition, the second speed drive gear 62 and the fourth speed drive gear 64 are selectively connectable to the first driving shaft 58 by a second to fourth synchronous engaging device (engagement switching device) S2, moreover, the sixth speed drive gear 66 and the eighth speed drive gear 68 are selectively connectable to the first driving shaft 58 by a sixth to eighth speed synchronous engaging device (engagement switching device) S4. Furthermore, the second speed drive gear 62, the fourth speed drive gear 64, the sixth speed drive gear 66, and the eighth speed drive gear 68 shown in FIG. 2 are the drive gears 7a on the first input shaft 6a shown in FIG. 1, and the second to fourth speed synchronous engaging device S2 and the sixth to eighth speed synchronous engaging device S4 shown in FIG. 2 are the first synchronous engaging device 21 shown in FIG. 1.

Additionally, the second clutch (a clutch for odd-numbered stages) CL2 is disposed on an axial end of the second input shaft 6b. The second clutch CL2 switches the engagement and disengagement between the second input shaft 6b and the second driving shaft 57 relatively rotatably fitted to the outer circumference of the second input shaft 6b. A first speed drive gear 61, a third speed drive gear 63, a fifth speed drive gear 65, and a seventh speed drive gear 67 are relatively rotatably supported on the second driving shaft 57. In addition, the first speed drive gear 61 and the third speed drive gear 63 are selectively connectable to the second driving shaft 57 by a first to third synchronous engaging device (engagement switching device) S1, moreover, the fifth speed drive gear 65 and the seventh speed drive gear 67 are selectively connectable to the second driving shaft 57 by a fifth to seventh speed synchronous engaging device (engagement switching device) S3. Furthermore, the first speed drive gear 61, the third speed drive gear 63, the fifth speed drive gear 65, and the seventh speed drive gear 67 shown in FIG. 2 are the drive gears 7b on the second input shaft 6b shown in FIG. 1, and the first to third speed synchronous engaging device S1 and the fifth to seventh speed synchronous engaging device S3 shown in FIG. 2 are the second synchronous engaging device 22 shown in FIG. 1.

In addition, a first to second speed driven gear 71, a third to fourth speed driven gear 73, a fifth to sixth speed driven gear 75, and a seventh to eighth speed driven gear 77 are fixed on the output shaft 6c. The first speed drive gear 61 on the second driving shaft 57 and the second speed drive gear 62 on the first driving shaft 58 are engaged with the first to second speed driven gear 71. The third speed drive gear 63 on the second driving shaft 57 and the fourth speed drive gear 64 on the first driving shaft 58 are engaged with the third to fourth speed driven gear 73. The fifth speed drive gear 65 on the second driving shaft 57 and the sixth speed drive gear 66 on the first driving shaft 58 are engaged with the fifth to sixth speed driven gear 75. And the seventh speed drive gear 67 on the second driving shaft 57 and the eighth speed drive gear 68 on the first driving shaft 58 are engaged with the seventh to eighth speed driven gear 77. Furthermore, the first to second speed driven gear 71, the third to fourth speed driven gear 73, the fifth to sixth speed driven gear 75, and the seventh to eighth speed driven gear 77 shown in FIG. 2 are the driven gears 7c on the output shaft 6c shown in FIG. 1.

A first gear shifting mechanism GR1 for setting even-numbered gear shift stages is composed of the first clutch CL1 described above, the second, fourth, sixth, and eighth speed drive gear 62, 64, 66, and 68, the second to fourth speed synchronous engaging device S2, and the sixth to eighth synchronous engaging device S4 provided on the first driving shaft 58. Similarly, a second gear shifting mechanism GR2 for setting odd-numbered gear shift stages is composed of the second clutch CL2 described above, the first, third, fifth, and seventh speed drive gear 61, 63, 65, and 67, the first to third speed synchronous engaging device 51, and the fifth to seventh synchronous engaging device S3 provided on the second driving shaft 57.

In the transmission 2, when the first clutch CL1 is engaged, driving force of the crankshaft 50a of the engine 50 is transmitted to the second gear shifting mechanism GR2 in a path of the torque converter 51, the drive gear 15 on the first input shaft 6a, the driven gear 56 on the second input 6b, the second input shaft 6b, and the second clutch CL2. Whereas, when the second clutch CL2 is engaged, driving force of the crankshaft 50a of the engine 50 is transmitted to the first gear shifting mechanism GR1 in a path of the torque converter 51, the first input shaft 6a, and the first clutch CL1.

Therefore, when the second clutch CL2 is engaged in a state where the first to third speed synchronous engaging device 51 is moved right and the first speed drive gear 61 is connected to the second driving shaft 57, the first speed gear shift stage is established. When the second clutch CL2 is engaged in a state where the second to fourth speed synchronous engaging device S2 is moved right and the second speed drive gear 62 is connected to the first driving shaft 58, the second speed gear shift stage is established. When the second clutch CL2 is engaged in a state where the first to third speed synchronous engaging device S1 is moved left and the third speed drive gear 63 is connected to the second driving shaft 57, the third speed gear shift stage is established. When the first clutch CL1 is engaged in a state where the second to fourth speed synchronous engaging device S2 is moved left and the fourth speed drive gear 64 is connected to the first driving shaft 58, the fourth speed gear shift stage is established. Also after thereof, switching the engagement between each synchronous engaging device S1 to S4 and the first or the second clutch CL1, CL2 enables to set each gear shift stage up to the eighth speed stage.

Figure 3:
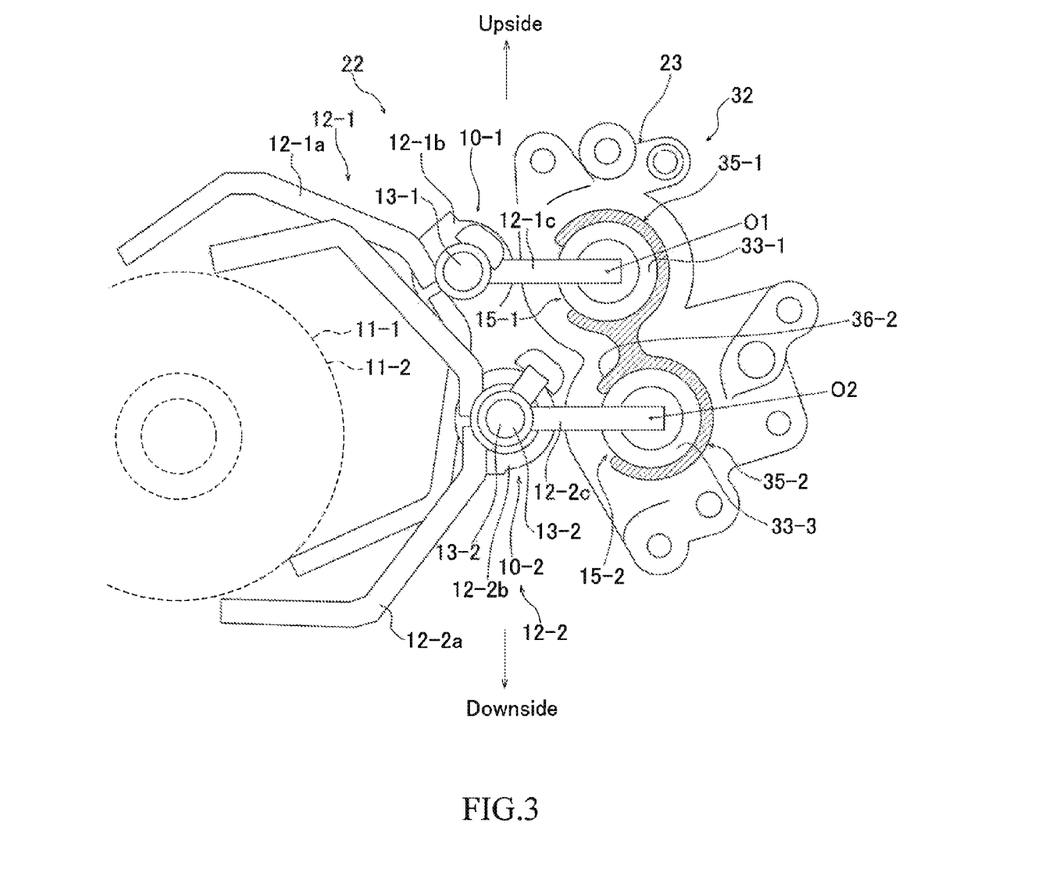
FIG. 3 is a schematic sectional side view of the shift actuator viewed from the axial direction.
Figure 4:
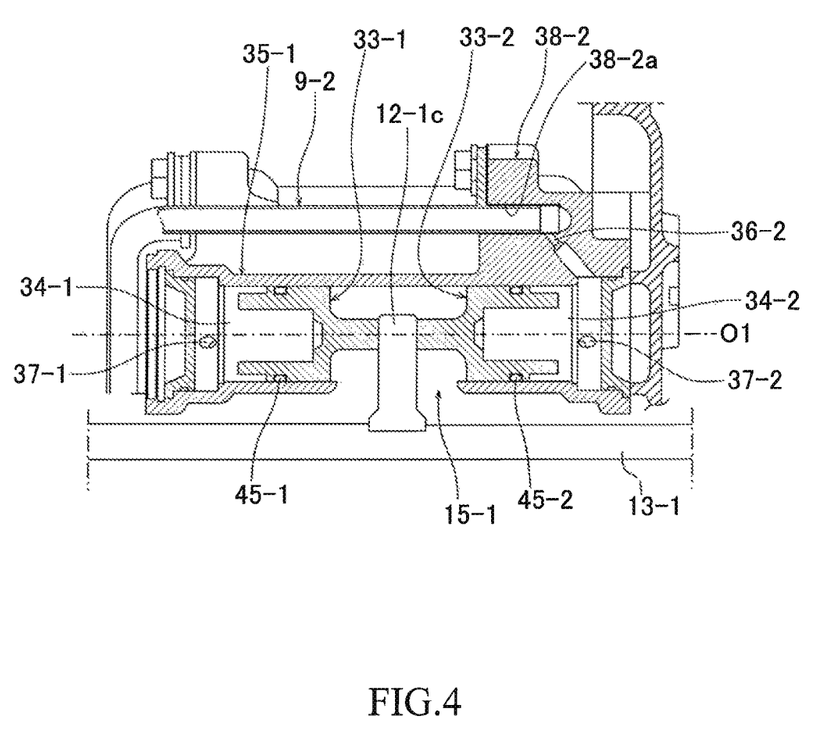
FIG. 4 is a schematic sectional side view of a part of the shift actuator viewed from the lateral to the axial direction.

The second synchronous engaging device 22 and the second shift actuator 32 shown in FIG. 1 are described hereinafter. FIG. 3 and FIG. 4 show the second synchronous engaging device 22 and the second shift actuator 32. FIG. 3 is a schematic sectional side view of the second synchronous engaging device 22 and the second shift actuator 32 viewed from the axial direction, and FIG. 4 is a schematic sectional side view of a part of the second shift actuator 32 viewed from the lateral to the axial direction. In FIG. 4, further, only the first cylinder 35-1 with which the second shift actuator 32 is provided and the components relevant to the same are shown. The second synchronous engaging device 22 includes a first mechanism 10-1 for selectively synchronizing and engaging a pair of the drive gears 7a adjacent to each other on the second input shaft 6b, and a second mechanism 10-2 for selectively synchronizing and engaging another pair of the drive gears 7a adjacent to each other on the second input shaft 6b. The second shift actuator 32 includes the first cylinder 35-1 having built-in components for driving the first mechanism 10-1, and the second cylinder 35-2 having built-in components for driving the second mechanism 10-2.

The first mechanism 10-1 is provided with a first synchro sleeve 11-1 having an approximately cylindrical shape with installed so as to be movable in the axial direction of the second input shaft 6b and a first shift fork 12-1 attached to the first synchro sleeve 11-1. In addition, the first shift fork 12-1 includes a first fork portion 12-1a having a forked shape with disposed on an outer circumferential side surface of the first synchro sleeve 11-1, a first base portion 12-1b into which a first fork shaft 13-1 is inserted on a root part of the first fork portion 12-1a, and a first arm portion 12-1c having a cylindrical shape with protruding from the first base portion 12-1b toward an opposite direction to the first fork portion 12-1a. The first fork shaft 13-1 penetrates so that the axial direction thereof is orthogonal to the surface of the first fork portion 12-1a, and supports the first shift fork 12-1, so as to be capable of moving back and forth along the axial direction. A tip of the first arm portion 12-1c is inserted to an opening portion 15-1 of the first cylinder 35-1.

The second mechanism 10-2 is provided with a second synchro sleeve 11-2 having an approximately cylindrical shape with installed so as to be movable in the axial direction of the second input shaft 6b and a second shift fork 12-2 attached to the second synchro sleeve 11-2. In addition, the second shift fork 12-2 includes a second fork portion 12-2a having a forked shape with disposed on an outer circumferential side surface of the second synchro sleeve 11-2, a second base portion 12-2b into which a second fork shaft 13-2 is inserted on a root part of the second fork portion 12-2a, and a second arm portion 12-2c having a cylindrical shape with protruding from the second base portion 12-2b toward an opposite direction to the second fork portion 12-2a. The second fork shaft 13-2 penetrates so that the axial direction thereof is orthogonal to the surface of the second fork portion 12-2a, and supports the second shift fork 12-2, so as to be capable of moving back and forth along the axial direction. A tip of the second arm portion 12-2c is inserted to a second opening portion 15-2 of the second cylinder 35-2.

Hereupon, in the plurality of the odd-numbered gear shift stages achieved by the drive gears 7a on the second input shaft 6b, the gear shift stages achieved by the second mechanism 10-2 are higher gear shift stages (gear shift stages on the side of low ratio OD) than the gear shift stages achieved by the first mechanism 10-1. For example, the gear shift stages achieved by the first mechanism 10-1 can be set to the first speed stage and the third speed stage, and the gear shift stages achieved by the second mechanism 10-2 can be set to the fifth speed stage and the seventh speed stage. In this case, the first mechanism 10-1 is the first to third speed synchronous engaging device S1 shown in FIG. 2, and the second mechanism 10-2 is the fifth to seventh speed synchronous engaging device S3 shown in FIG. 2.

Figure 5:
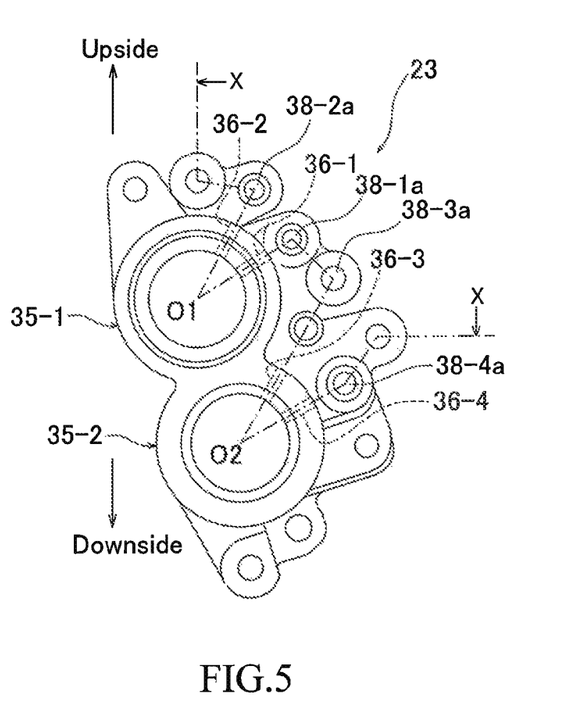
FIG. 5 shows a cylinder body viewed from the axial direction.
Figure 6:
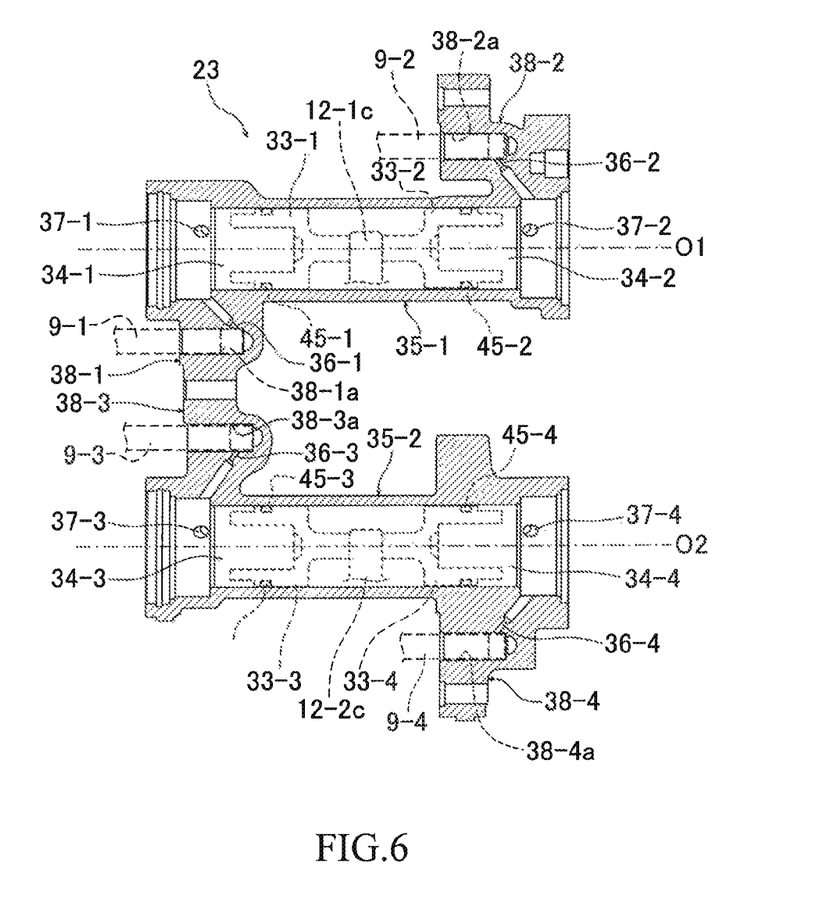
FIG. 6 is an X-X sectional arrow view of FIG. 5.
Figure 7:
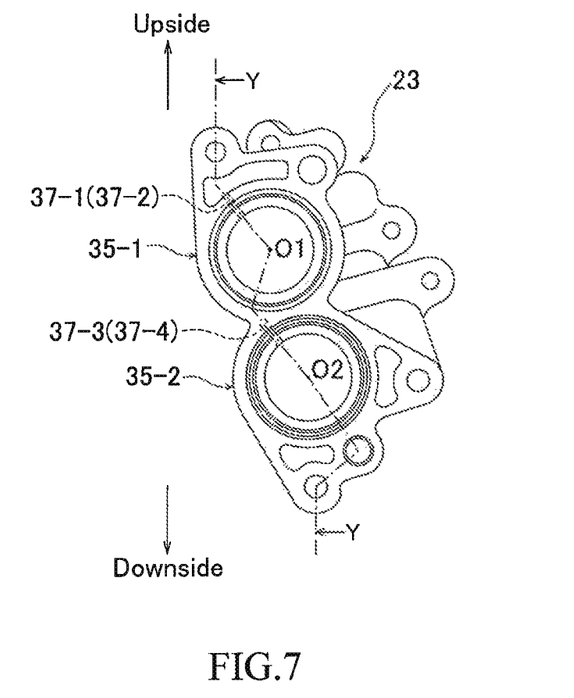
FIG. 7 shows a cylinder body viewed from the axial direction.
Figure 8:
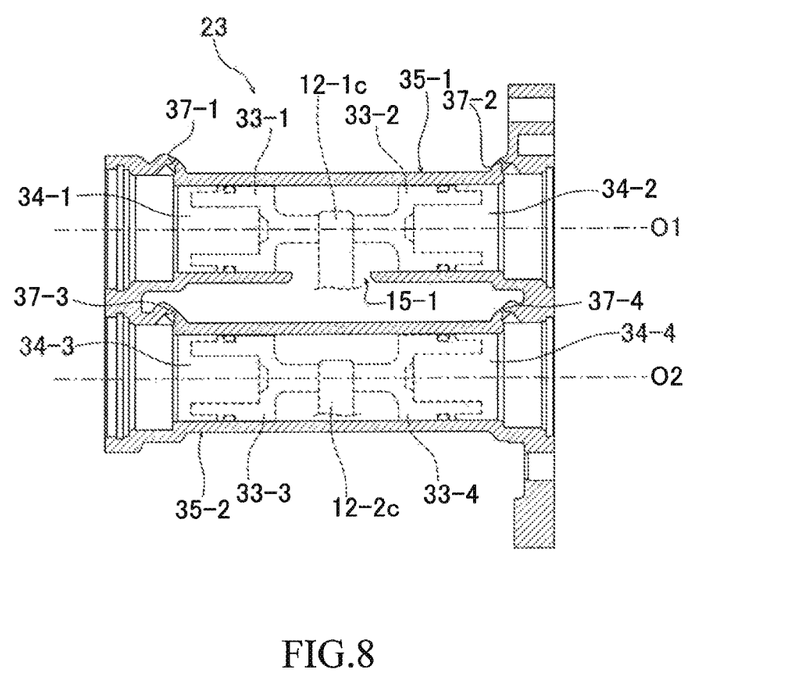
FIG. 8 is a Y-Y sectional arrow view of FIG. 7.

In addition, the second shift actuator 32 includes a cylinder body 23 at which the first and the second cylinder 35-1 and 35-2 are formed. FIG. 5 and FIG. 6 show the cylinder body 23. FIG. 5 and FIG. 7 show the cylinder body 23 viewed from the axial direction. FIG. 6 shows an X-X sectional arrow view of FIG. 5. FIG. 8 shows a Y-Y sectional arrow view of FIG. 7. Furthermore, upside and downside of the vertical direction in a state where the transmission 1 is installed are shown in FIG. 5 and FIG. 7.

As shown in FIG. 4 to FIG. 8, the first and the second cylinder 35-1 and 35-2 both includes a hollow approximately cylindrical portion. And the first and the second cylinder 35-1 and 35-2 are vertically arranged at predetermined intervals by paralleling the cylindrical axial directions (hereinafter referred to as "axial direction") of each other, and each of the cylinders 35-1 and 35-2 is arranged so that the axial directions thereof are parallel to the axial direction (shift direction) of the first fork shaft 13-1. In addition, as shown in FIG. 3, the first opening portion 15-1 to which the first arm portion 12-1c of the first shift fork 12-1 is inserted is formed on the cylindrical surface of the first cylinder 35-1, and the second opening portion 15-2 to which the second arm portion 12-2c of the second shift fork 12-2 is inserted is formed on the cylindrical surface of the second cylinder 35-2.

In addition, the second shift actuator 32 includes a first piston 33-1 and a second piston 33-2 slidably housed along the direction in the first cylinder 35-1, a first fluid pressure chamber 34-1 defined opposite to an end surface of the sliding direction of the first piston 33-1 in the first cylinder 35-1, and a second fluid pressure chamber 34-2 defined opposite to an end surface of the sliding direction of the second piston 33-2. Also, hydraulic oil from the hydraulic control body 5 is supplied to the first fluid pressure chamber 34-1 and the second fluid pressure chamber 34-2 through the first and the second hydraulic pipe 9-1 and 9-2, and the oil pressure is respectively provided to the first piston 33-1 and the second piston 33-2 by the hydraulic oil.

Thus, the second shift actuator 32 includes the first cylinder 35-1, the first piston 33-1 and the second piston 33-2 coaxially arranged in the first cylinder 35-1, the first and the second fluid pressure chamber 34-1 and 34-2 defined in the first cylinder 35-1 to provide hydraulic oil pressure to each of the first and the second piston 33-1 and 33-2, the first fork shaft 13-1 disposed so that the axial direction thereof is parallel to the axial direction of the first cylinder 35-1, the first arm portion (a first shift operating member) 12-1c supported by the first fork shaft 13-1 with inserted and disposed between the first piston 33-1 and the second piston 33-2 to move back and forth along the axial direction of the first fork shaft 13-1, and the first and the second hydraulic pipe (oil passage) 9-1 and 9-2 communicated from the hydraulic control body 5 to each of the first and the second fluid pressure chamber 34-1 and 34-2.

Furthermore, the second shift actuator 32 includes, as shown in FIG. 5 and FIG. 6, a first and a second connecting portion 38-1 and 38-2 connecting a first hydraulic pipe 9-1 with the first fluid pressure chamber 34-1, and a second hydraulic pipe 9-2 with the second fluid pressure chamber 34-2. The first and the second connecting portion 38-1 and 38-2 are the projecting portions integrally formed on an outer side surface of the first cylinder 35-1, wherein a first and a second insertion hole 38-1a and 38-2a to which tips of the first and the second hydraulic pipe (9-1, 9-2) are inserted are formed. The first and the second insertion hole 38-1a and 38-2a are the cylindrical portions disposed so that the axial directions thereof are parallel to the axial direction of the first cylinder 35-1. Also, the first and the second connecting portion 38-1 and 38-2 are respectively provided with the first and the second orifice portion 36-1 and 36-2. The first and the second orifice portion 36-1 and 36-2 are the communication paths which respectively communicate from the first and the second insertion hole 38-1a and 38-2a to the first and the second fluid pressure chamber 34-1 and 34-2, and a part thereof is set to have a diameter smaller than the inner diameters of the first and the second hydraulic pipe 9-1 and 9-2. In addition, the diameter of the first orifice portion 36-1 and the diameter of the second orifice portion 36-2 are mutually the same.

As shown in FIG. 5, the first and the second orifice portion 36-1 and 36-2 are provided adjacent to the first and the second fluid pressure chamber 34-1 and 34-2. Also, the first and the second orifice portion 36-1 and 36-2 are provided on the upper side on an outer circumferential wall of the first cylinder 35-1. That is, the first and the second orifice portion 36-1 and 36-2 are positioned on the upper side than the central axis O1 of the first cylinder 35-1.

Furthermore, as shown in FIG. 6, a first and a second air vent hole (through hole) 37-1 and 37-2 leading to the outside of from each of the first and the second fluid pressure chamber 34-1 and 34-2 are provided. The first and the second air vent hole 37-1, 37-2 are the through holes formed on the outer circumferential wall (the outer circumferential side surface) of the first cylinder 35-1. Also, the diameters of the first and the second air vent hole 37-1 and 37-2 are respectively set to have dimensions smaller than the inner diameters of the first and the second orifice portion 36-1 and 36-2.

As shown in FIG. 7, the first and the second air vent hole 37-1 and 37-2 are positioned on the upper side (upper than half) on the outer circumferential wall of the first cylinder 35-1. Whereby, the first and the second air vent hole 37-1 and 37-2 are positioned on the upper side than the central axis O1 of the first cylinder 35-1.

In addition, the second shift actuator 32 includes the second cylinder 35-2 disposed adjacent to the lower side of the first cylinder 35-1, a third piston 33-3 and a fourth piston 33-4 coaxially arranged in the second cylinder 35-2, a third and a fourth fluid pressure chamber 34-3 and 34-4 defined in the second cylinder 35-2 to provide hydraulic oil pressure to each of the third and the fourth piston 33-3 and 33-4, the second fork shaft 13-2 disposed so that the axial direction thereof is parallel to the axial direction of the first fork shaft 13-1 and of the second cylinder 35-2, the second arm portion (a second shift operating member) 12c supported by the second fork shaft 13-2 with inserted and disposed between the third piston 33-3 and the fourth piston 33-4 to move back and forth along the axial direction of the second fork shaft 13-2, and a third and a fourth hydraulic pipe 9-3 and 9-4 communicated from the hydraulic control body 5 to each of the third and the fourth fluid pressure chamber 34-3 and 34-4.

Furthermore, the second shift actuator 32 includes, as shown in FIG. 5 and FIG. 6, a third and a fourth connecting portion 38-3 and 38-4 for connecting the third hydraulic pipe 9-3 with the third fluid pressure chamber 34-3 and the fourth hydraulic pipe 9-4 with the fourth fluid pressure chamber 34-4. The third and the fourth connecting portion 38-3 and 38-4 are the projecting portions integrally formed on the outer circumferential wall (the outer circumferential side surface) of the second cylinder 35-2, wherein a third and a fourth insertion hole 38-3a and 38-4a to which tips of the hydraulic pipes 9 are inserted are formed. The third and the fourth insertion hole 38-3a and 38-4a are disposed so that the axial directions thereof are parallel to the axial direction of the second cylinder 35-2. Also, the third and the fourth connecting portion 38-3 and 38-4 are respectively provided with a third and a fourth orifice portion 36-3 and 36-4 having diameters smaller than the inner diameters of the third and the fourth hydraulic pipe 9-3 and 9-4. The third and the fourth orifice portion 36-3 and 36-4 are the communication paths which respectively communicate from the third and the fourth insertion hole 38-3a and 38-4a to the third and the fourth fluid pressure chamber 34-3 and 34-4, and a part thereof is set to have a diameter smaller than the inner diameters of the third and the fourth hydraulic pipe 9-3 and 9-4. In addition, the diameter of the third orifice portion 36-3 and the diameter of the fourth orifice portion 36-4 are mutually the same.

As shown in FIG. 5, the third and the fourth orifice portion 36-3 and 36-4 are provided on the upper side on the outer circumferential wall of the second cylinder 35-2. That is, the third and the fourth orifice portion 36-3 and 36-4 are positioned on the upper side than the central axis O2 of the second cylinder 35-2.

Furthermore, As shown in FIG. 6, a third and a fourth air vent hole (through hole) 37-3 and 37-4 leading to the outside from each of the third and the fourth fluid pressure chamber 34-3 and 34-4 are provided. The third and the fourth air vent hole 37-3 and 37-4 are the through holes formed on the outer circumferential side surface of the second cylinder 35-2. Also, the diameters of the third and the fourth air vent hole 37-3 and 37-4 are respectively set to have dimensions smaller than the inner diameters of the third and the fourth orifice portion 36-3 and 36-4.

As shown in FIG. 7, the third and the fourth air vent hole 37-3 and 37-4 are positioned on the upper side (upper than half) on the outer circumferential wall of the second cylinder 35-2. That is, the third and the fourth air vent hole 37-3 and 37-4 are positioned on the upper side than the central axis O2 of the second cylinder 35-2.

Hereupon, the diameters of the first and the second orifice portion 36-1 and 36-2 are set to have dimension mutually different from the diameters of the third and the fourth orifice portions 36-3, 36-4. In particular, the diameters of the first and the second orifice portion 36-1 and 36-2 are set to have dimensions smaller than the diameters of the third and the fourth orifice portion 36-3 and 36-4.

By means of the shift actuator of the present embodiments, the following effects can be achieved.

(1) The first to the fourth orifice portions 36-1 to 36-4 having diameters smaller than the inner diameters of each of the first to the fourth hydraulic pipe 9-1 to 9-4 are provided on the first to the fourth connecting portions 38-1 to 38-4 adjacent to the first and the second cylinder 35-1 and 35-2. This enables to shorten the time for filling the hydraulic pipes 9-1 to 9-4 with hydraulic oil when supplying oil pressure from the hydraulic control body 5 to the second shift actuator 32, in comparison with the conventional configuration which orifice portions are provided on oil passages in the hydraulic control body (hydraulic control device). This enables, as the present embodiments, to secure the satisfactory responsiveness of the second shift actuator 32 even when the hydraulic control body 5 which is a source of hydraulic supply and the first to the fourth fluid pressure chambers 34-1 to 34-4 of the second shift actuator 32 which are destinations of hydraulic supply are disposed on mutually separated positions.

(2) The first to the fourth orifice portions 36-1 to 36-4 having diameters smaller than the inner diameter of each of the first to the fourth hydraulic pipes 9-1 to 9-4 are provided on the first to the fourth connecting portions 38-1 to 38-4, whereby hydraulic oil remains in the first to the fourth fluid pressure chambers 34-1 to 34-4 of the second shift actuator 32 even when the engine of the vehicle and the transmission 1 is soaked (when the operation is stopped). This enables to secure responsiveness in filling the first to the fourth fluid pressure chambers 34-1 to 34-4 with hydraulic oil when the operation is restarted after soaking.

(3) The second shift actuator 32 of the present embodiments generates reaction force to the operation of the second shift actuator 32 by a damper effect of hydraulic oil remaining in the opposing fluid pressure chamber (the fluid pressure chamber on the opposite side) when either the first fluid pressure chamber 34-1 or the second fluid pressure chamber 34-2 is supplied with oil pressure to drive the first and the second piston 33-1 and 33-2. Also, each of the first to the fourth connecting portions 38-1 to 38-4 connecting each of the first to the fourth hydraulic pipes 9-1 to 9-4 and each of the first to the fourth fluid pressure chambers 34-1 to 34-4 is provided with each of the first to the fourth orifice portions 36-1 to 36-4, whereby backflow of hydraulic oil toward each of the hydraulic pipes 9-1 to 9-4 from the second shift actuator 32 can be restrained. This enables to generate larger reaction force to opposite fluid pressure chamber when the second shift actuator 32 is operated, whereby operation noise accompanying the operation of the shift actuator 32 (such as contact noise due to the contact of machine components) can be effectively reduced.

In addition, the hydraulic control body 5 which is a source of hydraulic oil supply is positioned on the lower side and the second shift actuator 32 which is a destination of hydraulic oil supply is positioned on the upper side, whereby hydraulic oil tends to flow back toward each of the hydraulic pipes 9-1 to 9-4 from the second shift actuator 32. Whereas, in the present embodiments, each of the first to the fourth connecting portions 38-1 to 38-4 disposed adjacent to the first to the fourth fluid pressure chambers 34-1 and 34-4 is provided with the first to the fourth orifice portions 36-1 to 36-4 having diameters smaller than the inner diameters of the first to the fourth hydraulic pipes 9-1 to 9-4. This enables to effectively restrain backflow of hydraulic oil toward each of the first to the fourth hydraulic pipes 9-1 to 9-4 from the second shift actuator 32. Therefore, larger reaction force can be generated in the opposing fluid pressure chamber when the second shift actuator 32 is operated, whereby operation noise accompanying the operation of the second shift actuator 32 (such as contact noise due to the contact of machine components) can be reduced.

Furthermore, in the second shift actuator 32 of the present embodiments, the diameters of the first and the second orifice portion 36-1, 36-2 and the diameters of the third and the fourth orifice portion 36-3, 36-4 are set to have mutually different dimensions.

In addition, a gear shift stage achieved at the second mechanism 10-2 is a higher gear shift stage (a gear shift stage on a low-ratio side (OD side)) than a gear shift stage achieved at the first mechanism 10-1, and the diameters of the first and the second orifice portion 36-1 and 36-2 are set to have smaller dimensions than the diameters of the third and the fourth orifice portion 36-3 and 36-4. As above, setting the diameters of the first and the second orifice portion 36-1 and 36-2 to the smaller dimensions than the diameters of the third and the fourth orifice portion 36-3 and 36-4 enables to set reaction force generated in the opposing piston when operating the first mechanism 10-1 larger than reaction force generated in the opposing piston when operating the second mechanism 10-2. Thus, the diameters of the orifices are set to be different according to the gear shift stage, whereby the optimum shift time in accordance with each gear shift stage can be achieved. Also, operation noise accompanying the operation of the second shift actuator 32 can be effectively reduced.

Furthermore, the first to the fourth air vent holes 37-1 to 37-4 penetrating to the outside from each of the first to the fourth fluid pressure chambers 34-1 to 34-4 are provided, and each diameter of the first to the fourth air vent holes 37-1 to 37-4 is set to have a dimension smaller than diameters of the first to the fourth orifice portions 36-1 to 36-4.

In the second shift actuator 32 of the present embodiments, by providing the above-mentioned first to the fourth orifice portions 36-1 to 36-4, air mixed into hydraulic oil in the first to the fourth fluid pressure chambers 34-1 to 34-4 is difficult to be discharged to the outside of the first to the fourth fluid pressure chambers 34-1 to 34-4, whereas by providing the first to the fourth air vent holes 37-1 to 37-4, the air can be effectively discharged to the outside of each fluid pressure chamber 34-1 to 34-4 even when air is mixed into hydraulic oil in each fluid pressure chamber 34-1 to 34-4 at the initial starting time or at the restarting time after the long-term soak.

Furthermore, in the second shift actuator 32 of the present embodiments, the first and the second air vent hole 37-1 and 37-2 are positioned on the upper side than the central axis O1 of the first cylinder 35-1, in a state where the first cylinder 35-1 is installed in the casing 3 of the transmission 1.

By means of this configuration, air mixed into hydraulic oil in the first and the second fluid pressure chamber 34-1 and 34-2 can be effectively discharged through the first and the second air vent hole 37-1 and 37-2. This enables to prevent the air from remaining in the first and the second fluid pressure chamber 34-1 and 34-2 even when the vehicle is left for a long time. Therefore, the starting responsiveness in restarting after leaving the vehicle for a long time can be improved.

Though the embodiments of the present invention are as described above, the present invention isn't limited to the above-mentioned embodiments, and various deformations can be achieved within a range of the technical ideas described in Claims, Specification, and Drawings. For example, though the second shift actuator 32 of the above-mentioned embodiments operates by oil pressure supplied to such as the first and the second fluid pressure chamber 34-1 and 34-2, the shift actuator according to the present invention may be configured so as to operate by pressure of another medium (fluid or gas) other than oil. Also, the specific shape, arrangement, and so on of the orifice portions and the air vent holes (through hole) with which the shift actuator according to the present invention is provided may be other shapes, arrangements, and dimensions not limited to the shown in the above-mentioned embodiments, only if the requirements described within claims of the present application are met.

What is claimed is:

1. A shift actuator comprising:
   a first cylinder disposed in a casing of a transmission mounted on a vehicle;
   a first piston and a second piston coaxially arranged in the first cylinder;
   a first and a second fluid pressure chamber defined in the first cylinder to provide fluid pressure to each of the first and the second piston;
   a first shaft disposed so that the axial direction thereof is parallel to the axial direction of the first cylinder;
   a first shift operating member supported by the first shaft with inserted and disposed between the first piston and the second piston to move back and forth along the axial direction of the first shaft;
   a hydraulic control device for regulating pressure of hydraulic oil discharged from a hydraulic source and supplying a same;
   a first and a second oil passage communicated from the hydraulic control device to each of the first and the second fluid pressure chamber;
   a first and a second connecting portion for connecting the first oil passage with the first fluid pressure chamber, and the second oil passage with the second fluid pressure chamber; and
   a first and a second orifice portion having a diameter smaller than the inner diameter of the first and the second oil passage provided on the first and the second connecting portions respectively.

2. The shift actuator according to claim 1, wherein:
height positions of the first and the second fluid pressure chamber are positioned on the upper side than a height position of the vertical direction of the hydraulic control device in a state where the transmission is installed, and
the first and the second orifice portion are respectively disposed adjacent to the first and the second fluid pressure chamber.

3. The shift actuator according to claim 1, comprising:
a first and a second through hole penetrating to the outside from each of the first and the second fluid pressure chamber,
wherein diameters of the first and the second through hole are set to have dimensions smaller than the inner diameters of the first and the second orifice portion.

4. The shift actuator according to claim 3,
wherein the first and the second through hole are disposed on the positions upper than a central axis of the first cylinder in a state where the first cylinder is installed in the casing of the transmission.

5. The shift actuator according to claim 1, comprising:
a second cylinder disposed adjacent to the first cylinder;
a third piston and a fourth piston coaxially arranged in the second cylinder;
a third and a fourth fluid pressure chamber defined in the second cylinder to provide fluid pressure to each of the third and the fourth piston;
a second shaft disposed so that the axial direction thereof is parallel to the axial direction of the second cylinder;
a second shift operating member supported by the second shaft with inserted and disposed between the third piston and the fourth piston to move back and forth along the axial direction of the second shaft;
a third and a fourth oil passage communicated from the hydraulic control device to each of the third and the fourth fluid pressure chamber;
a third and a fourth connecting portion for connecting the third oil passage with the third fluid pressure chamber, and the fourth oil passage with the fourth fluid pressure chamber; and
a third and a fourth orifice portion having a diameter smaller than the inner diameter of the third and the fourth oil passage provided to each of the third and the fourth connecting portion,
wherein diameters of the first and the second orifice portion and diameters of the third and the fourth orifice portion are set to have mutually different dimensions.

6. The shift actuator according to claim 5, comprising:
a first mechanism operated by the first shift operating member and a second mechanism operated by the second shift operating member, wherein:
a gear shift stage achieved by the second mechanism is higher than a gear shift stage achieved by the first mechanism, and
diameters of the first and the second orifice portion are set to have dimensions smaller than diameters of the third and the fourth orifice portion.

7. The shift actuator according to claim 5, wherein the transmission includes:
a first input shaft connected through a first clutch so as to be engaged with and disengaged from a driving shaft connected to a driving source of the vehicle;
a second input shaft connected through a second clutch so as to be engaged and disengaged from the driving shaft;
a plurality of drive gears disposed on the first input shaft to change speed of rotation caused by driving force input to the first input shaft;
another plurality of drive gears disposed on the second input shaft to change speed of rotation caused by driving force input to the second input shaft;
an output shaft on which a plurality of driven gears engaged with the plurality of drive gears are fixed to input driving force speed-changed through the drive gears and the driven gears;
a first synchronous engaging device operated by shift operating members other than the first and the second shift operating member, whereby one of the drive gears on the first input shaft is selectively synchronized and engaged with the first input shaft; and
a second synchronous engaging device operated by the first and the second shift operating member, whereby one of the drive gears on the second input shaft is selectively synchronized and engaged with the second input shaft,
wherein the drive gears on the first input shaft are the drive gears for setting even-numbered gear shift stages, and the drive gears on the second input shaft are the drive gears for setting odd-numbered gear shift stages.

8. The shift actuator according to claim 2, comprising:
a first and a second through hole penetrating to the outside from each of the first and the second fluid pressure chamber,
wherein diameters of the first and the second through hole are set to have dimensions smaller than the inner diameters of the first and the second orifice portion.

9. The shift actuator according to claim 2, comprising:
a second cylinder disposed adjacent to the first cylinder;
a third piston and a fourth piston coaxially arranged in the second cylinder;
a third and a fourth fluid pressure chamber defined in the second cylinder to provide fluid pressure to each of the third and the fourth piston;
a second shaft disposed so that the axial direction thereof is parallel to the axial direction of the second cylinder;
a second shift operating member supported by the second shaft with inserted and disposed between the third piston and the fourth piston to move back and forth along the axial direction of the second shaft;
a third and a fourth oil passage communicated from the hydraulic control device to each of the third and the fourth fluid pressure chamber;
a third and a fourth connecting portion for connecting the third oil passage with the third fluid pressure chamber, and the fourth oil passage with the fourth fluid pressure chamber; and
a third and a fourth orifice portion having a diameter smaller than the inner diameter of the third and the fourth oil passage provided to each of the third and the fourth connecting portion,
wherein diameters of the first and the second orifice portion and diameters of the third and the fourth orifice portion are set to have mutually different dimensions.

10. The shift actuator according to claim 3, comprising:
a second cylinder disposed adjacent to the first cylinder;
a third piston and a fourth piston coaxially arranged in the second cylinder;
a third and a fourth fluid pressure chamber defined in the second cylinder to provide fluid pressure to each of the third and the fourth piston;
a second shaft disposed so that the axial direction thereof is parallel to the axial direction of the second cylinder;

a second shift operating member supported by the second shaft with inserted and disposed between the third piston and the fourth piston to move back and forth along the axial direction of the second shaft;
a third and a fourth oil passage communicated from the hydraulic control device to each of the third and the fourth fluid pressure chamber;
a third and a fourth connecting portion for connecting the third oil passage with the third fluid pressure chamber, and the fourth oil passage with the fourth fluid pressure chamber; and
a third and a fourth orifice portion having a diameter smaller than the inner diameter of the third and the fourth oil passage provided to each of the third and the fourth connecting portion,
wherein diameters of the first and the second orifice portion and diameters of the third and the fourth orifice portion are set to have mutually different dimensions.

11. The shift actuator according to claim 4, comprising:
a second cylinder disposed adjacent to the first cylinder;
a third piston and a fourth piston coaxially arranged in the second cylinder;
a third and a fourth fluid pressure chamber defined in the second cylinder to provide fluid pressure to each of the third and the fourth piston;
a second shaft disposed so that the axial direction thereof is parallel to the axial direction of the second cylinder;
a second shift operating member supported by the second shaft with inserted and disposed between the third piston and the fourth piston to move back and forth along the axial direction of the second shaft;
a third and a fourth oil passage communicated from the hydraulic control device to each of the third and the fourth fluid pressure chamber;
a third and a fourth connecting portion for connecting the third oil passage with the third fluid pressure chamber, and the fourth oil passage with the fourth fluid pressure chamber; and
a third and a fourth orifice portion having a diameter smaller than the inner diameter of the third and the fourth oil passage provided to each of the third and the fourth connecting portion,
wherein diameters of the first and the second orifice portion and diameters of the third and the fourth orifice portion are set to have mutually different dimensions.

12. The shift actuator according to claim 6, wherein the transmission includes:
a first input shaft connected through a first clutch so as to be engaged with and disengaged from a driving shaft connected to a driving source of the vehicle;
a second input shaft connected through a second clutch so as to be engaged and disengaged from the driving shaft;
a plurality of drive gears disposed on the first input shaft to change speed of rotation caused by driving force input to the first input shaft;
another plurality of drive gears disposed on the second input shaft to change speed of rotation caused by driving force input to the second input shaft;
an output shaft on which a plurality of driven gears engaged with the plurality of drive gears are fixed to input driving force speed-changed through the drive gears and the driven gears;
a first synchronous engaging device operated by shift operating members other than the first and the second shift operating member, whereby one of the drive gears on the first input shaft is selectively synchronized and engaged with the first input shaft; and
a second synchronous engaging device operated by the first and the second shift operating member, whereby one of the drive gears on the second input shaft is selectively synchronized and engaged with the second input shaft,
wherein the drive gears on the first input shaft are the drive gears for setting even-numbered gear shift stages, and the drive gears on the second input shaft are the drive gears for setting odd-numbered gear shift stages.

* * * * *